United States Patent
Hueffer et al.

(10) Patent No.: US 9,481,763 B2
(45) Date of Patent: Nov. 1, 2016

(54) PREPARING CHLORIDE-FREE POLYETHYLENEIMINES

(71) Applicant: BASF SE, Ludwigshafen (DE)

(72) Inventors: Stephan Hueffer, Ludwigshafen (DE); Andreas Kramer, Friedelsheim (DE); Frank Dietsche, Schriesheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/100,440

(22) Filed: Dec. 9, 2013

(65) Prior Publication Data

US 2014/0163199 A1 Jun. 12, 2014

Related U.S. Application Data

(60) Provisional application No. 61/736,021, filed on Dec. 12, 2012.

(51) Int. Cl.
 *C08G 73/00* (2006.01)
 *C08G 73/02* (2006.01)

(52) U.S. Cl.
 CPC ....... *C08G 73/0213* (2013.01); *C08G 73/0206* (2013.01)

(58) Field of Classification Search
 None
 See application file for complete search history.

(56) References Cited

U.S. PATENT DOCUMENTS

| | | |
|---|---|---|
| 2,182,306 A | 12/1939 | Ulrich et al. |
| 3,203,910 A | 8/1965 | Wilson |
| 4,324,724 A | 4/1982 | Mueller et al. |
| 6,156,720 A * | 12/2000 | Boeckh et al. ............... 510/475 |

FOREIGN PATENT DOCUMENTS

| | | | |
|---|---|---|---|
| CA | 763506 A | * | 7/1967 |
| EP | 0 001 436 A1 | | 4/1979 |
| GB | 1 459 809 | | 12/1976 |
| WO | WO 97/40088 A1 | | 10/1997 |
| WO | WO 98/02482 A1 | | 1/1998 |

OTHER PUBLICATIONS

European Search Report issued Apr. 17, 2013 in Patent Application No. 12 19 6731 with English Translation of Category of Cited Documents.

* cited by examiner

*Primary Examiner* — Ana Woodward
(74) *Attorney, Agent, or Firm* — Oblon, McClelland, Maier & Neustadt, L.L.P.

(57) ABSTRACT

In a method of preparing polyalkyleneimines from alkyleneimines in the presence of a liquid solvent, and a catalyst, the preparing is effected semi-discontinuously in one reaction container. The preparing is optionally effected in the presence of further additives.

Polyalkyleneimines obtained by such methods and formulations thereof likewise form part of the subject matter of the invention, especially those having a low proportion of chloride-containing compounds. Such polyalkyleneimines have uses in the field of medical technology, printing media, wastewater treatment, surface treatment, cosmetics, laundry detergents, biotechnology, packaging, electronics, paper, building construction chemistry, textiles, chromatography, ion exchangers, oil industry, ceramics, glass, membrane technology, catalysts, electroplating, biocides or wood protection. Further possible uses include as corrosion inhibitor, dispersant, additive in oils, for formulation of drugs, haircare products, scents and aromas, for preparing gene vectors, for functionalizing and modifying surfaces in electroplating and medical technology or for preparing cleaning systems for the semiconductor industry and lithium batteries.

21 Claims, No Drawings

PREPARING CHLORIDE-FREE POLYETHYLENEIMINES

CROSS-REFERENCE TO RELATED APPLICATIONS

This application is a Non-Provisional of U.S. Provisional Application No. 61/736,021 filed on Dec. 12, 2012.

The present invention relates to methods of preparing polyalkyleneimines from alkyleneimines. The present invention further also relates to certain polyalkyleneimines and to formulations comprising polyalkyleneimines. The present invention further relates to the use of polyalkyleneimines in sectors where an elevated concentration of chloride has an adverse effect on performance characteristics.

Further embodiments of the present invention will be apparent from the claims, the description and the examples. It will be appreciated that the features of the subject matter of the present invention which have been mentioned hereinbefore and which will be elucidated hereinbelow are usable not just in the concrete combination indicated in each case, but also in other combinations, without stepping outside the scope of the invention. The embodiments of the present invention in which all the features have the preferred or particularly preferred meanings are preferred or, respectively, particularly preferred.

It is long known to prepare water-soluble polyethyleneimine from ethyleneimine and use it in papermaking for example.

U.S. Pat. No. 2,182,306 describes the polymerization of ethyleneimine in the presence of catalysts.

U.S. Pat. No. 3,203,910 describes polyhalogenated initiators for preparing polyalkyleneimines.

The conversion of ethyleneimine can also be carried out, as described in DE 1 169 131 for example, in the presence of other materials such as urea, phenyl isocyanate or diethyl carbonate. Conversion in the presence of amines generally leads to the preparation of polyethylenepolyamines.

DE 195 45 874 A1 describes methods of forming homopolymers of ethyleneimine in a continuous manner by polymerizing ethyleneimine in a solvent in the presence of catalysts at temperatures of at least 80° C. The catalysts mentioned are acidic-reacting materials, Brönsted acids such as mineral acids, organic acids or Lewis acids.

DE 101 11 776 B4 relates to a method of preparing aqueous ethyleneimine polymer solutions wherein ethyleneimine is polymerized in an aqueous medium at a temperature of less than 80° C. and subsequently undergoes a ripening process at a temperature of 100 to 150° C.

WO 97/40088 A1 and WO 98/02482 A1 describe methods of preparing finely divided water-insoluble polymers of aziridines by polymerizing aziridines in the presence in a solvent of crosslinkers comprising at least two functional groups. These polymers are used in the immobilization of active ingredients, as absorbents for aldehydes, ketones and acids and also for removing heavy metals from wastewaters.

DE 10 205 050 201 B3 describes the preparation of low-halide aqueous solutions of polymers having cationic amino groups by virtue of protonation or quaternization. The effect of cationic polymers of this type relies on the positive charges in the polymer molecules interacting with negative surface charges of suspended or emulsified particles.

The polyalkyleneimines known from the prior art cited above frequently have broad molecular weight distributions which, in certain uses, can have an adverse effect on the performance characteristics of the polymers. For example, polyalkyleneimines having comparatively narrow molecular weight distributions generally display improved dispersing properties in respect of pigments.

Frequently, the polyalkyleneimines known from the prior art are prepared using chloride-containing initiators or catalysts. The polymers thus obtained contain relatively high amounts of chloride which, in industrial use, can have negative repercussions for the performance of the particular polymer. For example, polyethyleneimines are used as corrosion inhibitors, yet an elevated salt content in the form of chlorides leads to increased occurrence of undesired pitting. Polyalkyleneimines having a high chloride content can further also not be used in applications where high thermal stresses are encountered. Toxic compounds such as dioxins for example can be formed under high thermal stress when such highly chloride-containing polyalkyleneimines are used as soot dispersants in motor oils for example.

The present invention has for its object to provide methods of preparing polyalkylenepolyimines, especially polyethyleneimines, that lead to a narrow molecular weight distribution. It is a further object of the present invention to provide polyalkyleneimines, especially polyethyleneimines, that contain a low proportion of chlorine-containing impurities.

We have found that these objects are achieved by a method of preparing polyalkyleneimines from alkyleneimines in the presence of
  a. a liquid solvent, and
  b. a catalyst
wherein the preparing is effected semi-discontinuously, preferably batchwise, in one reaction container.

Semi-discontinuously is to be understood in the context of the present invention as meaning that the production process is started by metering alkyleneimines, for example aziridine, into the previously introduced initial charge, for example water, an amine and an initiator or catalyst, in the reaction container and is completely discontinued either after a certain reaction time, preferably from 5 to 30 h, or a certain conversion of the alkyleneimine, preferably above 99% conversion of the alkyleneimine, has been reached. In contradistinction to a continuous process, no further reactants are added to maintain the reaction and it is not just a part of the reaction mixture which is separated off. After the reaction is discontinued, the product is purified if necessary, in particular liquid solvent and/or catalyst is wholly or partly separated off, in order that the polyalkyleneimines may be obtained. The polyalkyleneimines are thus preferably prepared batchwise, i.e., in individual lots. One advantage of semi-discontinuous production is that the molecular weight distribution of the polyalkyleneimines can be better policed compared with a continuous process in that the polymers obtained generally have a narrower distribution.

The method of the present invention can utilize a large number of different alkyleneimines according to the desired field of use for the polyalkyleneimines. Ethyleneimine, 2-methylaziridine, 1-(2-hydroxyethyl)aziridine and 1-(2-aminoethyl)aziridine are preferably used as alkyleneimines. As will be readily understood, mixtures of various alkyleneimines can also be used. Therefore, the method of the present invention provides copolymers of the alkyleneimines as well as homopolyalkyleneimines. The method of the present invention is preferably used to obtain polyethyleneimines.

Liquid solvents (a.) are generally in the form of liquids at a pressure of 1 bar to 2 bar in a temperature range of 80 to 120° C., preferably 85 to 105° C. It will be readily understood that mixtures of solvents can also be used as liquid solvents (a.). The solvents used are generally inert hydrocarbons or polar solvents such as alcohols or water.

An aqueous solvent is preferably used as liquid solvent. The aqueous solvent may comprise alcohols and/or amines as further solvent components as well as water. The aqueous solvent comprises at least 35 wt % of water based on the total amount of all further solvent components and water. Preferably the aqueous solvent comprises at least 60 wt %, more preferably at least 70 wt %, even more preferably at least 80 wt % and yet even more preferably at least 90 wt % of water. It is very particularly preferable to use water as liquid solvent.

Catalysts (b.) are preferably acids or acidic compounds. The acids or acidic compounds are generally Brönsted or Lewis acids. Preferably, the reaction of the catalyst with water produces Brönsted acids which are simple to remove wholly or partly from the reaction mixture after the reaction has taken place. Examples of catalyst (b.) are sulfuric acid, methanesulfonic acid, dichloroethane, butyl chloride, formic acid, acetic acid, carbon dioxide. Formic acid and carbon dioxide are preferred. Very particular preference is given to carbon dioxide which forms carbonic acid on contact with water and is simple to remove from the reaction mixture after the reaction.

In a further embodiment of the method according to the present invention, the way the alkyleneimines are converted to polyalkyleneimines is c. optionally in the presence of further additives.

Useful further additives c. include, for example, primer, e.g. amines or comonomers. Preference is given to using methylamine, dimethylamine, ethylamine, diethylamine, propylamine, ethylenediamine, diethylenetriamine, triethylenetetramine or 3,3-dimethylaminopropylamine, especially ethylenediamine as primer.

In one preferred embodiment of the method according to the present invention, neither the liquid solvent (a.), nor the catalyst (b.), nor the optional additives (c.) contain chlorine-containing compounds. Particular preference is given to an embodiment of the method according to the present invention where no chlorine-containing compounds whatsoever are present in the reaction and the preparing is thus effected without the presence of chlorine-containing compounds.

The method of the present invention is carried out in reaction containers with which a person skilled in the art is familiar from the prior art. An example of a possible procedure is for the solvent, for example water to be initially charged to a reaction container and optionally admixed with an additive, for example a primer such as ethylenediamine. After the catalyst e.g. an acid such as formic acid or carbon dioxide has been added, the mixture is heated to the desired reaction temperature, preferably between 85 and 105° C. and the metered addition is commenced of the alkyleneimine, for example ethyleneimine. The reaction pressure at this stage is generally between 1 and 2 bar. Alternatively, the catalyst, e.g., the acid as initiator can also be metered concurrently with the alkyleneimine. On completion of the alkyleneimine addition the mixture can be heated to temperatures between 120 and 180° C. to complete the polymerization reaction and degrade the remaining alkyleneimine and accordingly the reaction pressure generally rises to 2-8 bar.

In one preferred embodiment of the method according to the present invention, carbon dioxide is used as catalyst and is passed in the reaction container under the surface of the liquid, preferably aqueous solvent.

The present invention further provides polyalkyleneimines, especially polyethyleneimines, which are prepared by the method of the present invention. These polyalkyleneimines, especially polyethyleneimines, preferably have a molar mass distribution (molecular weight distribution) with a number average $M_n$ of 300 to 500000 g/mol, preferably 500 to 50000 g/mol, more preferably 600 to 20000 g/mol and even more preferably 1000 to 15000 g/mol and a polydispersity ($M_w/M_n$ with $M_w$: weight average) of 1.3 to 5, preferably of 1.3 to 2 and more preferably of 1.4 to 1.6.

Preference is further given to polyalkyleneimines, especially polyethyleneimines, obtained according to the present invention with a degree of branching (DB) of more than 50 and preferably of more than 60. Polyalkyleneimines can be characterized via their degree of branching (DB). To define the degree of branching, reference is made to H. Frey et al., Acta Polym. 1997, 48, 30. The degree of branching DB is defined therein as $$DB(\%)=(T+Z)/(T+Z+L)\times 100, \text{ where}$$

T is the average number of terminally bound monomeric units (primary amino groups),
Z is the average number of branching monomeric units (tertiary amino groups),
L is the average number of linearly bound monomeric units (secondary amino groups).

The degree of branching DB of the polyalkyleneimines obtained according to the present invention is preferably in the range from 55 to 95%, preferably in the range from 57 to 90% and more preferably in the range from 60 to 80%.

In one preferred embodiment of the polyalkyleneimines, especially polyethyleneimines, obtained according to the present invention, these only contain a small proportion of chlorine-containing impurities, the proportion of chlorine-containing impurities being not more than 0.5 wt %, preferably not more than 0.1 wt %, even more preferably not more than 0.01 wt % and yet even more preferably not more than 0.001 wt % and yet even still more preferably not more than 0.0001 wt %, based on the amount of polyalkyleneimine, especially polyethyleneimine.

The polyalkyleneimines obtained according to the present invention are frequently used as constituents of formulations. These formulations according to the present invention can be solid or liquid. Liquid formulations are preferred. It is particularly preferred for solvents to be present in the formulations alongside the polyalkyleneimines. The formulations concerned are preferably aqueous formulations, more preferably acidic formulations and especially formulations of acidic cleaning solutions. The proportion of polyalkyleneimines in the formulation is generally in the range from 0.1 to 10 wt %, based on the total amount of the formulation. The proportion of polyalkyleneimines is preferably in the range from 0.1 to 5 wt %, particularly in the range from 0.1 to 2.5 wt %.

The present invention further provides for the use of the above-described polyalkyleneimines, especially polyethyleneimines, according to the present invention or obtained according to the present invention, which contain only a low proportion of chlorine-containing impurities, in sectors where an elevated concentration of chlorine has an adverse effect on performance characteristics.

Preference here is given to sectors in the field of medical technology, printing media, wastewater treatment, surface treatment, cosmetics, laundry detergents, biotechnology, packaging, electronics, paper, building construction chemistry, textiles, chromatography, ion exchangers, oil industry, ceramics, glass, membrane technology, catalysts, electroplating, biocides or wood protection.

Particular preference is given to the use as corrosion inhibitor, dispersant, additive in oils especially lubricating and motor oils, for formulation of drugs, haircare products, scents and aromas, for preparing gene vectors, for functionalizing and modifying surfaces in electroplating and medical technology or for preparing cleaning systems for the semiconductor industry and lithium batteries.

The present invention provides semi-discontinuous methods of preparing polyalkyleneimines from alkyleneimines. The polyalkyleneimines obtained or obtainable according to the present invention are notable for a narrow molar mass distribution which leads to an improved dispersing performance. The polyalkyleneimines further have a negligible content of chloride-containing impurities which are problematic in certain uses.

The invention is further elucidated by the examples without the examples restricting the subject matter of the invention.

EXAMPLES

Example 1

Example of a General Method of Synthesis

From 0.0 to 100 g of water, from 0.01 g to 20 g of ethylenediamine and from 0.01 g to 30 g of carbon dioxide are initially charged to a reaction vessel and heated to a temperature in the range from 80° C. to 120° C. This is followed by the addition of 500 g ethyleneimine, optionally dissolved in water at 99% to 10% (weight %). The addition is metered and generally takes from 1 h to 24 h. Following a subsequent reaction time of 2 h to 24 h, the reaction mixture is heated to a temperature in the range from 120° C. to 180° C. Thereafter, the reaction is complete and the ethyleneimine has been more than 99% converted.

The reaction mixture is treated under reduced pressure at temperatures between 80° C. and 180° C. to remove the water and some of the carbon dioxide from the reaction mixture. The chloride content is below 10 ppm.

When the initiator used is 6.4 g of butyl chloride, metered into the reaction batch concurrently with the ethyleneimine, the chloride content can be down to 0.46 wt % based on the reaction mixture.

Example 2

Polyethyleneimines are also used as efficient corrosion inhibitors in many applications. But the positive effect on the protection of metal surfaces can be offset by the presence of chloride compounds/chloride ions in particular.

For instance, the surface corrosion of steel is reduced by up to 70% on adding 0.5-2 wt % of a polyalkyleneimine to an acidic cleaning solution. The amount of polyalkyleneimine used is based on the amount of acid cleaning solution plus polyalkyleneimine.

The acidic cleaning solution corresponds to an aqueous formulation consisting of 10 wt % of methanesulfonic acid, 6 wt % of a non-ionic surfactant (Lutensol TO12; C13 oxo process alcohol+12 EO), 1.5 wt % of what is prepared according to the present invention (Mn 1000-25000, Mw/Mn<2; Cl content<0.01%) in water (as balance to 100 wt %).

Comparative tests were carried out with polyamines having a Cl content of 2%. Metal strips (steel, Gardobond OC; 0.3×10.5×19 cmx, from Chemetall) were suspended in a dip tank and left therein at 40° C. for 30 minutes.

Gravimetric removal was subsequently determined after all panels had been tared first.

In addition, an electrochemical method of measurement (Tafel plot, see W. Stephan Tait; Introduction to Electrochemical Corrosion Testing for Practical Engineers and Scientists, PairODocs Publication 1994, page 55 ff; ISBN 0-9660207-0-7) to measure the so-called corrosion current. In this method, current-voltage curves are determined in that, more particularly, the position of the open circuit potential (OCP) and its course/constancy over time permit information to be gleaned as to a) the passivation and b) the robustness of corrosion control. The measurements were carried out with a VFP 600 potentiostat from Gamry. The measurement was carried out on untreated steel panels (Gardobond OC; 10.5·19 cm, from Chemetall).

The measurements were performed aqueously in a 5% by weight solution of sodium methanesulfonate as electrolyte and in each case with the addition of 2 wt % (based on the overall formulation) of polyalkyleneimines (polyethyleneimine, see table 1). The dried panels were examined with an optical microscope at 100 fold magnification to assess the surface morphology, more particularly the pitting corrosion.

The results in table 1 show that polyalkyleneimines can be used in principle as corrosion inhibitors to protect against acidic media. The polyamines obtained according to the present invention amplify this effect by additionally providing excellent protection against pitting corrosion. The corrosion takes place remarkably uniformly across the surface without discernible change in surface morphology. This is also reflected in the significantly flatter rise (or decrease to more negative values) in the OCP values.

Examples 3-6 are inventive experiments according to the present invention. Examples 7-9 are comparative experiments not according to the present invention. Example 10 is a control experiment not according to the present invention.

TABLE 1

| Example | Polyethyleneimine a) Mw [g/mol] b) Mw/Mn c) Cl [%] | Gravimetric removal (40° C., 30 min) [mg] | OCP, 3 min [mV] | OCP, 90 min [mV] | Surface/pitting corrosion |
|---|---|---|---|---|---|
| Ex. 3 | 800 1.6 <0.01 | 42 | −430 | −510 | smooth surface |
| Ex. 4 | 750000 1.8 <0.01 | 54 | −415 | −530 | smooth surface |
| Ex. 5 | 5000 1.6 <0.01 | 31 | −400 | −489 | smooth surface |
| Ex. 6 | 25000 1.7 <0.01 | 44 | −392 | −492 | smooth surface |
| Ex. 7 | 800 2.6 0.9 | 92 | −435 | −540 | ca. 30 pitts/cm$^2$ |
| Ex. 8 | 5000 3.1 1.4 | 121 | −410 | −565 | ca. 40 pitts/cm$^2$ |
| Ex. 9 | 25000 3.6 1.4 | 133 | −422 | −590 | ca. 40 pitts/cm$^2$ |
| Ex. 10 | — none | 162 | −590 | −710 | rough surface, altogether severe corrosion |

Using, by contrast, polyethyleneimines from a production process leading to a chloride content of about 1 wt % by the very nature of the process, so-called pitting corrosion is obtained. Pitting corrosion is determined as pitts/cm$^2$.

Pitting corrosion is a particularly unwelcome/harmful type of corrosion, which frequently occurs even at very low use concentrations for the polyethyleneimines.

With the polyalkyleneimines from the inventive method, pitting corrosion is no longer observed and the advantage of lower surface corrosion can only thus be reflected at all in extended service lives of technical apparatus.

Example 3

Polyethyleneimines are also often used as dispersants, for example as dispersants of carbon black or nanoparticulate pigments in organic media/oils. These media also encounter higher temperatures in technical use (for example in the case of motor oils and hydraulic fluids).

The presence of chloride in organic media must be avoided in these cases, since toxic compounds such as, for example, dioxins can form. Against this background, the polyethyleneimines obtained according to the present invention can be used as high-performance dispersants.

Example 4

Use for pretreatment of steel for bonding with epoxy adhesive (T-peel test).

The polyamines obtained according to the present invention are used for priming steel or to be more precise galvanized steel to increase the adherence on bonding with multi-component adhesives and at the same time reduce the corrosion-induced submigration, or debonding.

Bonding tests were carried out for this in line with VDA 230-213 on steel strips (elo. galvanized steel; DC 05). The metal strips were pretreated before bonding with a 1% by weight solution of the polyamines in water by spraying (10 g of primer solution/m$^2$, followed by a drying step at 50° C., 15 minutes).

Metal strips were subsequently treated with the epoxy adhesive from Dow BETAMATE™ 1496 V (in line with VDA 230-213). Curing took place at 175° C. (30 min). The strips were next provided with a cationic electropaint (KTL from BASF Coatings, Cathoguard 500 application as per VDA 230-213).

The bonded metal strips were subsequently subjected to aging in the form of 10 rounds of the VDA cycle test for steel substrates as per VDA 621-415.

The T-peel test is used to determine the failure mode (cohesive failure or adhesive failure).

The test results listed in table 2 are averages from two tests in each case. The tensile tests on "unaged" specimens are carried out immediately after KTL cathodic electrocoating.

Failure mode analysis is done visually by determining the area ratios of cohesive failure (CF) and adhesive failure (AF).

TABLE 2

Averages of T-Peel strengths and strength decreases or increase in aged samples compared with unaged samples

| Example | Polyethyleneimine a) Mw [g/mol] b) Mw/Mn c) Cl [%] | Tensile test unaged [N/mm] | Tensile test aged [N/mm] | Strength loss (−)/ increase (+) [%] | Fracture mode % CF % AF OK/not OK |
|---|---|---|---|---|---|
| Ex. 3 | 800 1.6 <0.01 | 22.04 | 18.3 | −16.97 | 100 CF OK |
| Ex. 4 | 750000 1.8 <0.01 | 20.85 | 17.35 | −16.79 | 100 CF OK |
| Ex. 5 | 5000 1.6 <0.01 | 21.08 | 17.90 | −15.09 | 100 CF OK |
| Ex. 6 | 25000 1.7 <0.01 | 22.74 | 19.12 | −15.92 | 100 CF OK |
| Ex. 7 | 800 2.6 0.9 | 21.84 | 14.10 | −35.44 | 70 CF 30 AF not OK |
| Ex. 8 | 5000 3.1 1.4 | 19.43 | 13.82 | −28.87 | 60 CF 40 AF not OK |
| Ex. 9 | 25000 3.6 1.4 | 19.91 | 13.96 | −29.88 | 60 CF 40 AF not OK |
| Ex. 10 | — none | 17.30 | 13.64 | −21.16 | 60 CF 40 AF not OK |

The experimental findings demonstrate the adherence-amplifying effect of polyalkyleneimines (about +20% before aging). After storage under corrosion-promoting conditions, the bonding force decreases dramatically in tests 5-7, basically back down to the level without the polyalkyleneimine. Accordingly, the failure mode also deteriorates with significant proportions of adhesive failure.

The inventive examples show the highest increase in bonding power before storage coupled with the lowest decrease after aging. Accordingly, the fracture mode is impeccable with 100% adhesive fracture (fracture within the polymer matrix).

We claim:

1. A method of producing a polyalkyleneimine having a degree of branching of more than 50% from an alkyleneimine, the method comprising semi-discontinuously reacting at least one alkyleneimine in the presence of an aqueous solvent and carbon dioxide as a catalyst in one reaction container to produce a polyalkyleneimine, wherein:
    the at least one alkyleneimine is metered into an initial charge comprising the aqueous solvent, the carbon dioxide, and an additive selected from the group consisting of methylamine, dimethylamine, ethylamine, diethylamine, propylamine, ethylenediamine, diethylenetriamine, triethylenetetramine, and 3,3-dimethylaminopropyl amine; and
    the carbon dioxide is a sole catalyst in the reaction.

2. The method according to claim 1, wherein the polyalkyleneimine is produced from the alkyleneimine in the presence of ethylenediamine as the additive.

3. The method according to claim 1, wherein the polyalkyleneimine is produced from the alkyleneimine in the absence of a chlorine-containing compound.

4. The method according to claim 1, wherein the alkyleneimine is ethyleneimine, 2-methylaziridine, 1-(2-hydroxyethyl)aziridine, 1-(2-amino ethyl)aziridine, or a combination thereof.

5. The method according to claim 1, wherein the additive is selected from the group consisting of dimethylamine, ethylamine, diethylamine, propylamine, ethylenediamine, diethylenetriamine, triethylenetetramine, and 3,3-dimethylaminopropyl amine.

6. A polyalkyleneimine obtained by the method according to claim 1.

7. The polyalkyleneimine according to claim 6, wherein the polyalkyleneimine has a number average molecular weight Mn of 300 to 500 000 g/mol and a polydispersity of 1.3 to 5.

8. The polyalkyleneimine according to claim 6, wherein the polyalkyleneimine has a degree of branching ranging from 55 to 95%.

9. The polyalkyleneimine according to claim 6, comprising not more than 0.5 wt % of chlorine-containing impurities of not more than 0.5 wt % based on a total amount of the polyalkyleneimine.

10. A method, comprising contacting the polyalkyleneimine according to claim 9 with an article of manufacture.

11. The method according to claim 10, wherein the article of manufacture is a component of a medical device, a printing media, an article for wastewater treatment, an article for surface treatment, a cosmetic, a laundry detergent, an article of biotechnology, an article of packaging, an electronic article, a paper, an article of building construction, a textile, an article of chromatography, an ion exchanger, an oil, a ceramic, a glass, an article of membrane technology, a catalyst, an article of electroplating, a biocide or an article of wood protection.

12. The method according to claim 10, wherein the polyalkyleneimine is adapted to function as a corrosion inhibitor, a dispersant, or an additive suitable for an application selected from the group consisting of formulating an oil, formulating a drug, formulating a haircare product, formulating a scent, formulating an aroma, preparing a gene vector, functionalizing and modifying a surface in electroplating, functionalizing and modifying a surface in a medical technology, preparing a cleaning system for semiconductor industry, and for preparing a lithium battery.

13. A formulation comprising the polyalkyleneimine according to claim 6.

14. A method, comprising contacting the formulation according to claim 13 with an article of manufacture.

15. The method according to claim 14, wherein the article of manufacture is a component of a medical device, a printing media, an article for wastewater treatment, an article for surface treatment, a cosmetic, a laundry detergent, an article of biotechnology, an article of packaging, an electronic article, a paper, an article of building construction, a textile, an article of chromatography, an ion exchanger, an oil, a ceramic, a glass, an article of membrane technology, a catalyst, an article of electroplating, a biocide or an article of wood protection.

16. The method according to claim 14, wherein the formulation is adapted to function as a corrosion inhibitor, a dispersant, or an additive suitable for an application selected from the group consisting of formulating an oil, formulating a drug, formulating a haircare product, formulating a scent, formulating an aroma, preparing a gene vector, functionalizing and modifying a surface in electroplating, functionalizing and modifying a surface in a medical technology, preparing a cleaning system for semiconductor industry, and for preparing a lithium battery.

17. The method of claim 1, wherein the polydispersity of the polyalkyleneimine ranges from 1.4 to 1.8.

18. The method of claim 1, wherein the proportion of chlorine-containing impurities in the polyalkyleneimine is not more than 0.5 wt % based on the amount of the polyalkyleneimine.

19. The method of claim 1, wherein the proportion of chlorine-containing impurities in the polyalkyleneimine is not more than 0.1 wt % based on the amount of the polyalkyleneimine.

20. The method of claim 1, wherein the at least one alkyleneimine is metered into an initial charge consisting of the aqueous solvent, the carbon dioxide, and the additive selected from the group consisting of methylamine, dimethylamine, ethylamine, diethylamine, propylamine, ethylenediamine, diethylenetriamine, triethylenetetramine, and 3,3-dimethylaminopropyl amine.

21. The method of claim 1, consisting of semi-discontinuously reacting the at least one alkyleneimine in the presence of the aqueous solvent and the carbon dioxide as the sole catalyst in the one reaction container to produce the polyalkyleneimine, wherein the at least one alkyleneimine is metered into an initial charge consisting of the aqueous solvent, the carbon dioxide, and the additive selected from the group consisting of methylamine, dimethylamine, ethylamine, diethylamine, propylamine, ethylenediamine, diethylenetriamine, triethylenetetramine, and 3,3-dimethylaminopropyl amine.

* * * * *